United States Patent
Erickson

Patent Number: 6,098,067
Date of Patent: *Aug. 1, 2000

[54] REMOTE COMPUTER MANAGEMENT SYSTEM

[75] Inventor: Alan K. Erickson, Carnation, Wash.

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,988

[22] Filed: May 2, 1997

[51] Int. Cl.⁷ ........................................ G06F 17/30
[52] U.S. Cl. ........................ 707/10; 707/9; 707/104; 709/223; 709/224
[58] Field of Search .................. 707/104, 10, 100, 707/9; 395/200.47, 200.49; 709/223, 224; 340/825.06

[56] References Cited

U.S. PATENT DOCUMENTS

| | | | |
|---|---|---|---|
| 4,718,025 | 1/1988 | Minor et al. | 364/550 |
| 4,868,818 | 9/1989 | Madan et al. | 371/11.3 |
| 5,329,619 | 7/1994 | Page et al. | 709/203 |
| 5,394,556 | 2/1995 | Oprescu | 709/220 |
| 5,463,381 | 10/1995 | Ryu et al. | 340/825.15 |
| 5,530,957 | 6/1996 | Koenig | 707/100 |
| 5,606,669 | 2/1997 | Berlin et al. | 709/223 |
| 5,630,184 | 5/1997 | Roper et al. | 709/221 |
| 5,644,686 | 7/1997 | Hekmatpour | 706/45 |
| 5,644,738 | 7/1997 | Godlman et al. | 345/352 |
| 5,673,190 | 9/1997 | Kahleck et al. | 364/131 |
| 5,684,988 | 11/1997 | Pitchaikani et al. | 707/104 |
| 5,761,507 | 6/1998 | Govett | 709/304 |
| 5,764,230 | 6/1998 | Baradel et al. | 345/364 |
| 5,778,224 | 7/1998 | Tode et al. | 709/100 |
| 5,781,726 | 7/1998 | Pereira | 709/200 |
| 5,802,286 | 9/1998 | Dere et al. | 709/220 |
| 5,826,253 | 10/1998 | Bredenberg | 707/2 |
| 5,874,964 | 2/1999 | Gille | 345/356 |

Primary Examiner—Thomas G. Black
Assistant Examiner—Jean Bolte Fleurantin
Attorney, Agent, or Firm—Banner & Witcoff, Ltd.

[57] ABSTRACT

A computer management system for managing files and executing applications on multiple, remote networked computers from a single server. A hierarchical system is defined where each computer is a named node and computer nodes are organized into group nodes. Children nodes inherit the characteristics of their parent nodes. Actions or computer commands are assigned to nodes. The actions are made generic by use of variables whose values are set uniquely for each node. Thus a single action script or group of computer commands is applied to multiple computers having different characteristics. The user need only define a single generic script to affect changes and actions at multiple, different platform computers.

35 Claims, 6 Drawing Sheets

# REMOTE COMPUTER MANAGEMENT SYSTEM

FIELD OF THE INVENTION

The invention relates to the management of multiple servers or computers over a distributed network. In particular, the invention relates to a system for applying a set of actions to multiple computers based on the individual characteristics of each computer.

STATEMENT OF THE PROBLEM

There exists no efficient way to manage multiple, distributed computers or servers (hereinafter "computers") from a single location in a Windows environment. Consider where one needs to update an e-mail program, for example, on 100 remote computers. One presently has several options for performing the upgrade operation, however none of the presently available options are efficient or flexible.

One existing method would be to go physically to each of the 100 machines and perform the required upgrade steps. These steps might include deleting certain files and copying certain newer files to each machine. Another existing method is to use a batch file. Batch files, however require a large amount of setup time and require that the user have complete knowledge of each computer to be accessed. In addition, there must be different batch files for, as an example, each different architecture of computer on which the file management is to occur. Of the 100 machines to be upgraded, for example, there might be Intel processor-based machines, ALPHA processor-based computers and PowerPC processor-based machines as well as other platforms. Different batch files are necessary for each platform. Even within a platform type, different computers can have different setups requiring further unique batch files for each setup. Moreover, the next time files are manipulated on the same or a different set of computers, such as for the next e-mail system upgrade, entirely new batch files are necessary.

There exists a need for a computer management system allowing the remote management of multiple computers. There exists a further need for a remote computer management system that allows the definition of a "generic" script by a user and applies the script to each computer irrespective of platform type or individual computer organization.

STATEMENT OF THE SOLUTION

The above-described problems and others are solved and an advance in the art is achieved by the remote computer management system of the present invention. The system of the present invention allows one to manage files on multiple networked computers which utilize multiple different platforms all from a single server and all with a single 'script'. The script is comprised of actions to be applied to all of the selected computers and is successively executed on each selected computer. Therefore a user, working from a single server, builds and executes a script which manages files or runs applications at any number of remote computers while automatically adjusting for differences in platform and setup of the various remote computers.

The network of computers is arranged hierarchicly to simplify the task of managing computers of different platform types and setups. Each computer or group of computers is represented as a node in the hierarchy. Each node in the hierarchy has associated with it certain actions. Actions are commands such as COPY, DELETE, CREATE DIRECTORY or any other command that can be executed on a computer. Actions in the present invention may include variables. Variables represent arguments in commands. The command arguments can be unique to each node by setting the variables to be used with the actions.

Each node in the hierarchy inherits the actions and variables of its hierarchical parent(s). One selects the nodes in the hierarchy upon which one wants the file management system of the present invention to operate. When executed upon a selected node, the file management system of the present invention applies the actions and variables inherited from any parent nodes to the selected node. The system then applies to the selected node those actions and variables that are assigned to the selected node. A single action is applied to computers of various types by utilizing the variables embedded in the action. Values for the variables are obtained for a selected computer by querying the registry of the selected computer or by storing the variable values at the server.

An important piece of the file management system is the hierarchical organization of the computers. This allows the computers to be sorted intelligently. Each computer is represented as a node and multiple computers are arranged in a 'group' which is also a node in the hierarchy. For example, a first group of nodes might be all Pentium™-based computers while a second group of nodes might be all PowerPC-based computers. A single script of actions is applied to both groups of computers with different variables, or command arguments, being supplied for the different computers. Each node inherits the actions and variables of its parent(s). Each node also can supplement the inherited actions and variables with its own actions and variables. This provides a powerful tool for organizing the computers by platform, for example.

The system of the present invention allows a user to hierarchicly arrange a network of computers to which a script of actions is to be applied. The system of the present invention provides the arguments for these actions. For example, if certain files are being copied to a number of computers by the system of the present invention, an English language computer will receive a different set of files than a French language computer. The system of the present invention, by a combination of the hierarchical structure and the use of variables, copies the proper set of files to each machine.

DETAILED DESCRIPTION

Figure 1:
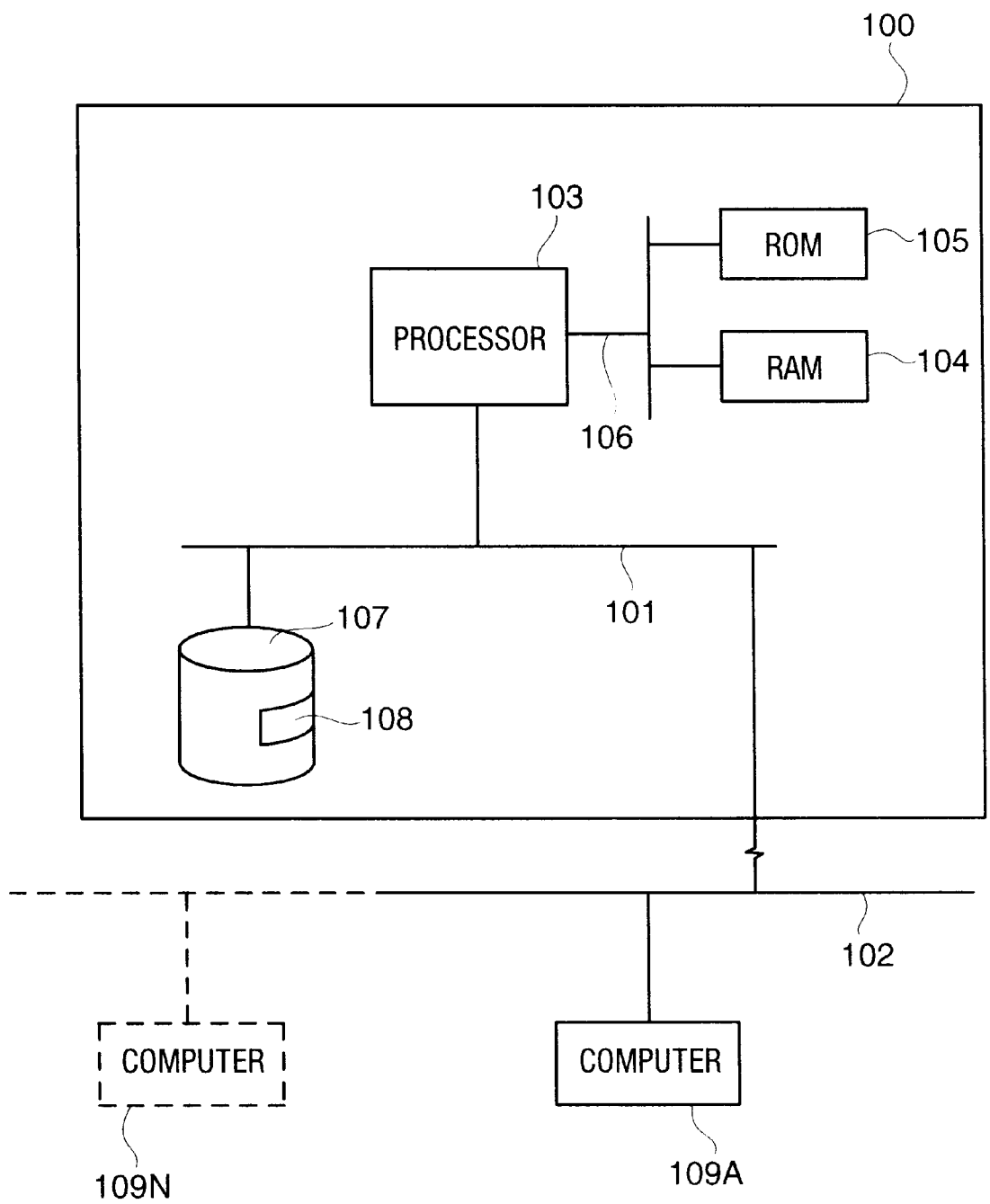
FIG. 1 illustrates a network-computing environment in block diagram form.

General Network Computing Environment—FIG. 1

FIG. 1 illustrates a block diagram of server 100 connected over local bus 101 to network 102. Also connected to network 102 are computers 109A–109N all operable for the exchange of information therebetween. Computer 109A represents a first computer while computer 109N represents any number of additional computers connected to network 102. Server 100 communicates with computers 109A–109N using a standard communications protocol as described in more detail below. Programmed instructions for the computer management system of the present invention are executable on processor 103. Processor 103 stores and/or retrieves the programmed instructions and/or data from memory devices that include, but are not limited to, Random Access Memory (RAM) 104 and Read Only Memory (ROM) 105 by way of memory bus 106. Another accessible memory device includes non-volatile memory device 107 by way of local bus 101. Programmed instructions for implementing the computer management system of the present invention are stored on non-volatile memory device 107 as part of application 108.

The above description of server 100 is applicable as well to the operation of computers 109A–109N. Server 100 is different from computers 109A–109N only semantically in that the computer management system of the present invention allows one to run applications on remote computers, such as computers 109A–109N, from a single computer, such as server 100.

Figure 2:
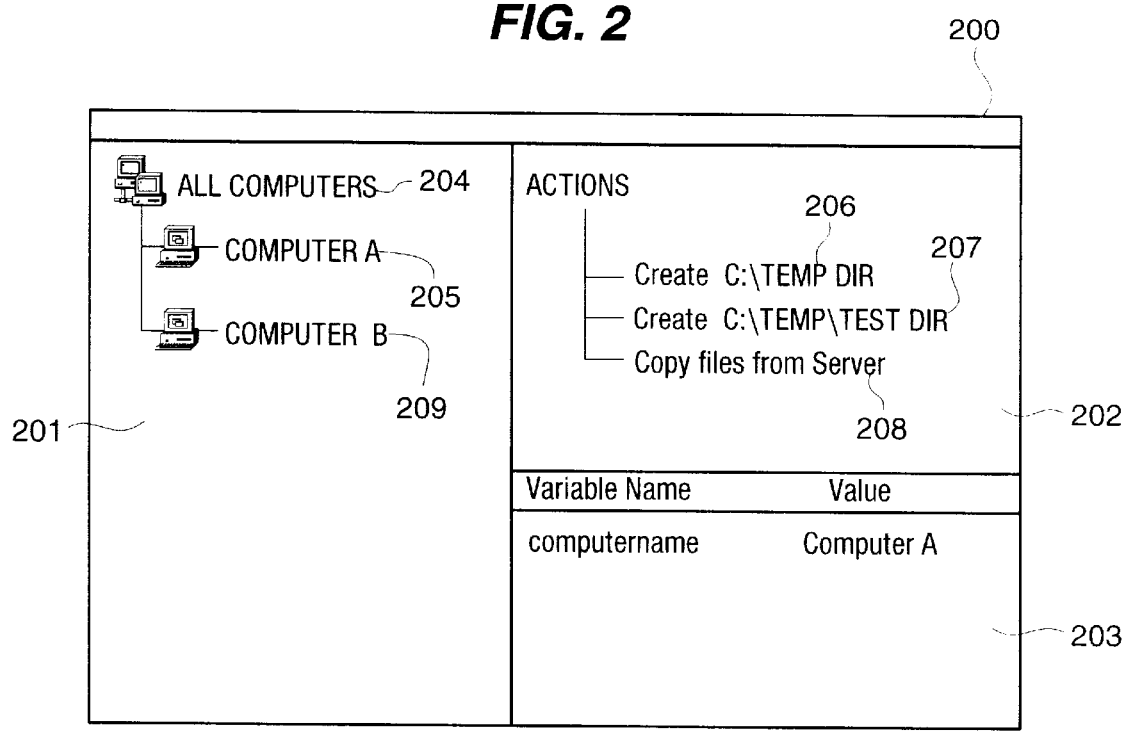
FIG. 2 is a representation of a main screen of the user interface of the system of the present invention.
Figure 3:
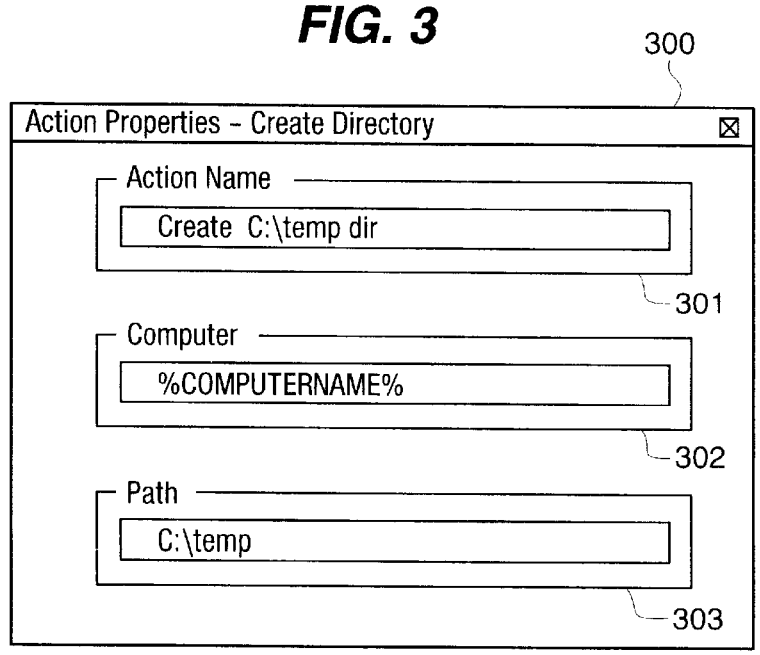
FIG. 3 is a representation of an action properties screen of the user interface of the system of the present invention.
Figure 4:
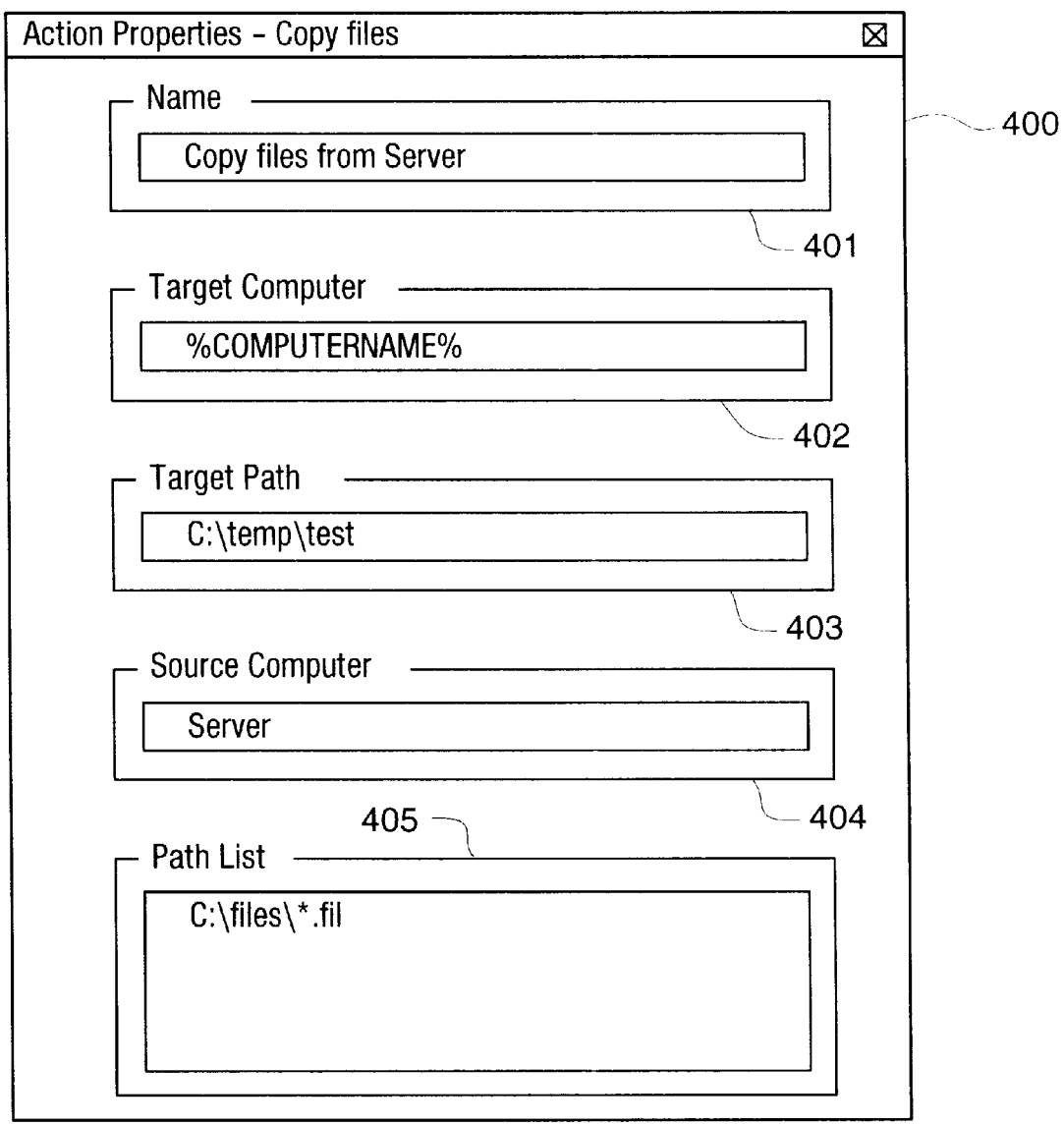
FIG. 4 is a representation of an action properties screen of the user interface of the system of the present invention.

Computer Management System in General—FIGS. 2–4

The computer management system of the present invention can operate to execute any actions, steps or applications at a remote computer that could be executed at the remote computer were a user to be operating the remote computer itself. The computer management system of the present invention allows a user to execute actions, steps or applications on a remote computer but to do so from a central server location. Also, a user of the system of the present invention can execute actions on multiple remote computers using a single script of actions, as described below. The examples described with respect to FIGS. 2–4 and FIGS. 5–7 are simplistic but are illustrative of the functionality of the system of the present invention.

The operation of the computer management system of the present invention is first described with respect to a network of computers including only the server from which the system of the present invention is executed and one remote computer. FIG. 2 illustrates an exemplary user interface of the computer management system of the present invention. Screen 200 includes hierarchy window 201, actions window 202 and variables window 203. Screen 200 is viewed on the monitor of a server (not shown) from which a user of the present invention configures and operates the system of the present invention. A user interacts with screen 200 and various related screens discussed below to define the network hierarchy and assign actions and variables to nodes within the hierarchy. Once the hierarchy is defined and configured, the system of the present invention is executed to apply the appropriate set of actions to each node in the hierarchy.

In the example of FIG. 2 there is only one remote computer, Computer A (not shown), that is shown in hierarchy window 201 and therefore only one computer that is amenable to management from the server. The computer named Computer A corresponds to one of remote computers 109A–109N.

The top hierarchy level of hierarchy window 201 is node 204 which is labeled "All Computers". The entries in hierarchy window 201 below "All Computers" represent the nodes available to the computer management system of the present invention. In this example there is are two computer nodes. One node is named "Computer A" and its availability to the system of the present invention is indicated as node 205 in hierarchy window 201. The other node is named "Computer B" and its availability to the system of the present invention is indicated as node 209 in hierarchy window 201.

When node 205 is selected in hierarchy window 201, actions window 202 shows the actions assigned to the node Computer A. In the example of FIG. 2, the system of the present invention is configured to create a temporary directory on computer node 205 and then copy a set of files from the server to the computer node 205. Actions 206–208 are referred to as a script or an action script. Each action is simply a package of commonly performed operations. Actions 206–208 operate to accomplish the creation of the temporary directory and the copying of files from the server to node 205. Action 206 is a "Create Directory" action. A Create Directory action operates to create a new directory on a node. In the example of FIG. 2, action 206 is named "create c:\temp dir" and operates to create a new directory named "temp" as a subdirectory of the root directory on node 205 (Computer A). Action 207 is another Create Directory action and it operates to create a subdirectory of c:\temp named "test". This directory, c:\temp\test, is the directory to which the files are copied to from the server. Action 208, a "Copy" action, operates to copy a set of files from the server to the c:\temp\test directory of Computer A.

In a preferred embodiment of the present invention, each action is configured using an Action Properties window. A user enters information at an Action Properties window to name and configure an action. FIG. 3 illustrates an exemplary Action Properties window 300 for action 206. The name of action 206, "create c:\temp dir", is entered by a user in field 301 of Action Properties window 300. Field 302 contains the name of the node to which this action applies. In the example of FIG. 3, a variable, "%COMPUTERNAME%", is entered in field 302 rather than an actual value. In this example the "%" delimiters indicate a variable name as opposed to a fixed value. Variable values are set for each node based upon the variable definitions for each node. When an action script is applied to a given node the actions use the variable values assigned for the given node. Field 303 contains the path for the directory to be created by operation of this action.

With reference to FIG. 2 the variable COMPUTERNAME is set, in variables window 203, to a value of "computerA". Thus when action 206 executes, the value "computerA" replaces the variable "COMPUTERNAME" in the action properties for action 206 and the Create Directory action is applied to Computer A.

Use of a variable in field 302 of action properties window 300 rather than an actual value allows this action to be associated with other nodes without the need to change the action properties. For example, action 206 could instead be associated with All Computers node 204. This means that action 206 is applied to all nodes, i.e. a global action. Consider a node 209 named Computer B which is also a child node of All Computers node 204. The node Computer A and the node Computer B would both inherit the actions of All Computers node 204 as children nodes of All Computers node 204. Action 206 uses the value for "COMPUTERNAME" associated with Computer A ("Computer A") when it is executed with respect to Computer A. Action 206 uses the value for "COMPUTERNAME" associated with Computer B ("Computer B") when it is executed with respect to Computer B. This is a simple example of the power available in the computer management system of the present invention due to the inheritance and variables features of the present invention.

FIG. 4 illustrates action properties window 400 for action 208. Action properties window 400 includes information about the name of action 208, the source path of the files to be copied and the target path to which the files are to be copied. Field 401 contains the name of action 208, "copy files from server". Field 402 contains the name of the target computer for the file copy action. Field 402 contains the same variable, %COMPUTERNAME%, as discussed with respect to FIG. 3. Field 403 contains the path of the directory on %COMPUTERNAME% to which the files are to be copied. In this example the target path is the directory created by operation of actions 206–207, c:\temp\test. Field 404 contains the name of the computer on which are located the files to be copied. In this example the files are located on the server on which is operating the computer management system of the present invention. Field 405 contains the path on the server for the files to be copied. In this example the files are located in directory c:\files on the server. It is apparent to those skilled in the art that the windows of FIGS. 2–4 could be arranged in different formats and include different types of information while still accomplishing the basic objectives of the present invention. For example, variables can be used for any purpose in configuring actions to allow each action to be widely used with any computer.

Figure 5:
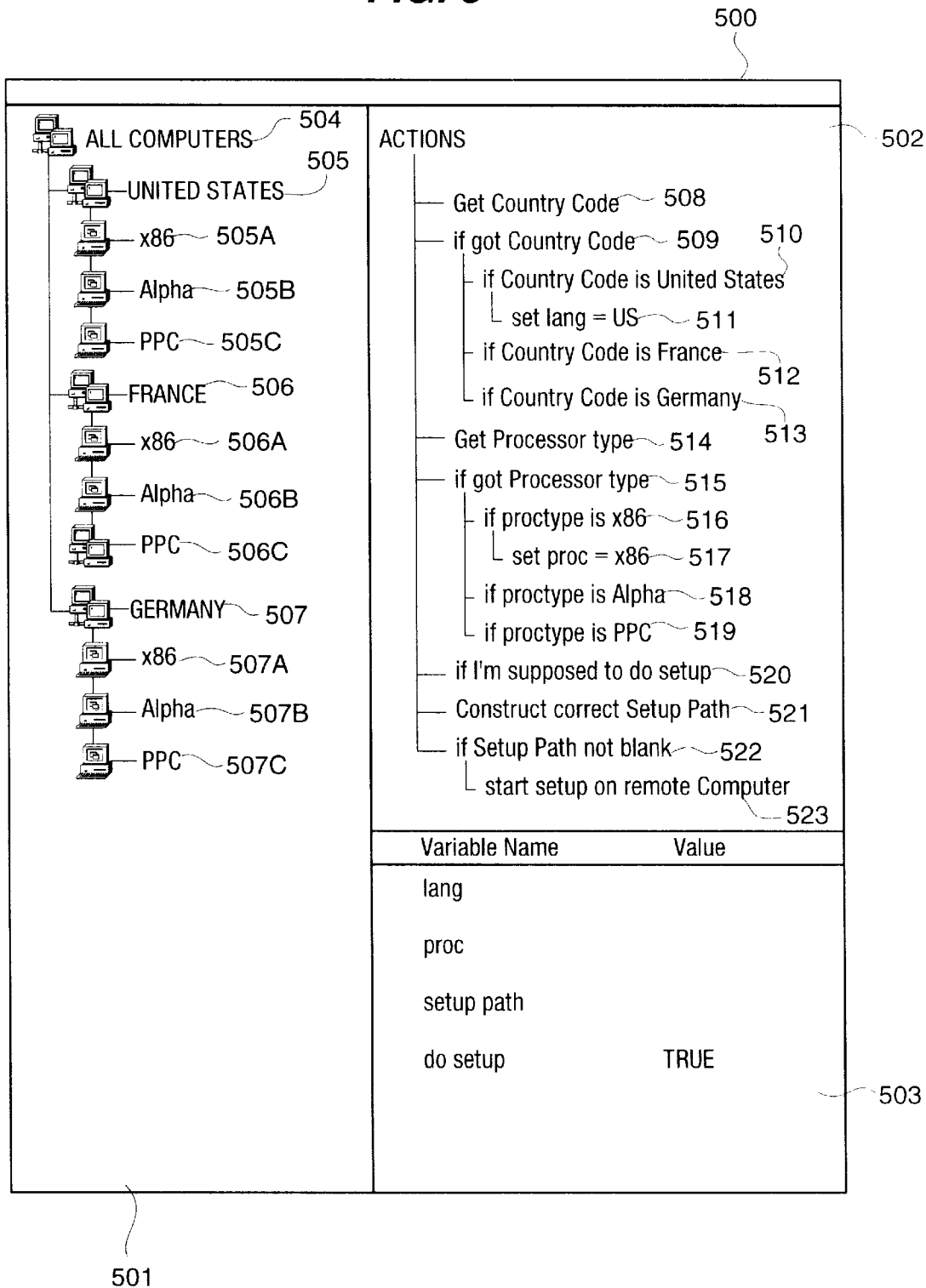
FIG. 5 is a representation of a main screen for a further example of the user interface of the system of the present invention.
Figure 6:
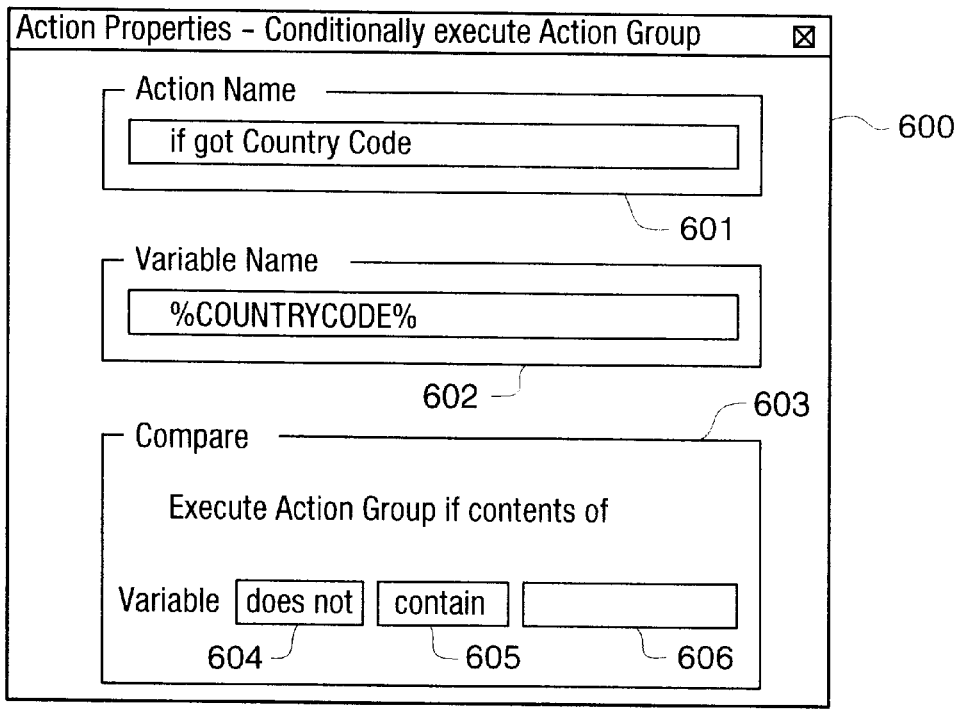
FIG. 6 is a representation of an action properties screen of the user interface of the system of the present invention.
Figure 7:
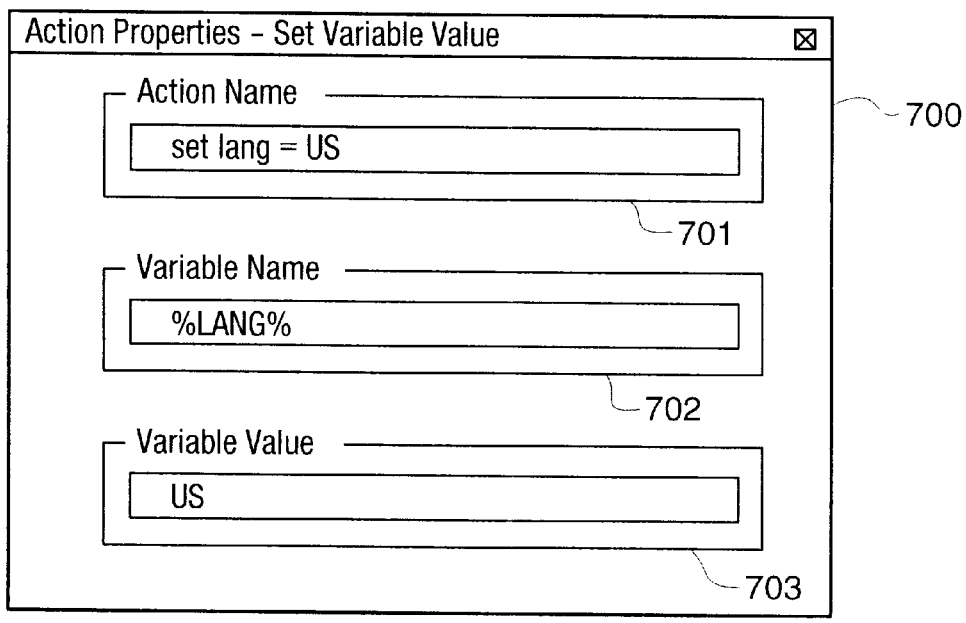
FIG. 7 is a representation of an action properties screen of the user interface of the system of the present invention.

Computer Management System—Further Detail FIGS. 5–7

The above example of FIGS. 2–4 illustrates a simple application of the computer management system of the present invention. The hierarchy consists of only a single computer and the action script performs a relatively simple task of creating a directory on the remote computer and then copying files to that newly created directory. More valuable applications of the present invention utilize the inheritance feature of the hierarchical arrangement combined with the use of variables. Also, more valuable applications make use of the system's ability to gather information from remote computers and use that information to set values for variables used in action scripts. Any operations that a user could perform directly on a computer can be packaged in actions in the system of the present invention and applied to multiple servers using the hierarchy format and variables provided by the present invention.

FIG. 5 illustrates a more complex example of the computer management system of the present invention. Screen 500 includes hierarchy window 501, actions window 502 and variables window 503. Hierarchy window 501 shows the hierarchical structure of all computers addressed in this exemplary usage of the computer management system of the present invention. The example of FIG. 5 represents an application of the present invention in a testing environment where there exists a large group of computers of various platforms on which is tested a certain computer program. Each time the program under test is updated or changed the revised version must be loaded on each computer and tested on all the various platform configurations. The action script displayed in actions window 502 is used, as described herein, to setup each computer in the testing topology for a test of the revised program under test. It is apparent to those skilled in the art that the example of FIGS. 5–7 is merely exemplary of the type of application that can be made of the system of the present invention.

The remote computers are arranged hierarchicly by language and processor type. Hierarchy window 501 illustrates the hierarchical arrangement of group node 504 which is the node containing all computers. All of the remote computers are organized into group nodes 505–507. Groups nodes 505–507 share group node 504 as a parent node. This means that every node within group node 504 inherits the actions and variables assigned to group node 504. Group node 505 contains the "United States" language computers of any processor type. Group node 506 contains the "French" language computers of any processor type. Group node 507 contains the "German" language computers of any processor type. Group node 506, the French language computers, itself contains a group node 506C. Group node 506C contains multiple PowerPC based computers (not shown). Group node 505, the U.S. Language computers, contains three computer nodes 505A–505C. Computer node 505A represents an Intel-based computer, computer node 505B represents an ALPHA based computer and computer node 505C represents a PowerPC based computer. Likewise, group nodes 506 and 507, the French and German nodes, contain computers of Intel, ALPHA and PowerPC processors types.

In the example of FIG. 5, group node 504, the "All Computers" node, is selected. Actions window 502 displays the actions associated with the node selected in hierarchy window 501. Every node, including group nodes and computer nodes, in hierarchy window 501 inherits the actions and variables of group node 504. Therefore the action script displayed in actions window 502 associated with group node 504 is by inheritance associated with each computer and group node in hierarchy window 501. Of course, each node indicated in hierarchy window 501 can itself have actions and variables associated with it that supplement or amend the actions associated with the parent group node 504.

As noted above, the action script displayed in actions window 502 operates to define and execute the proper setup of each computer, regardless of processor type and language, for the testing of a certain computer program under test. When the computer management system of the present invention is executed, the action script is applied sequentially to each computer node in the hierarchy, as described below. Generally speaking, the action script of actions window 502 operates to determine the country code, determine the processor type and construct and execute the proper setup for each computer in the hierarchy of group node 504.

The actions comprising the action script of window 502 operate to first determine the language of the computer to which the script is currently being applied (the "current computer"). Action 508 is a "Get Registry Data"action. Get Registry Data actions are used to retrieve information from the registry file of a remote computer. Action 508 operates to retrieve the country code from the registry file of the current computer. The next group of actions 509–513 operate to set the value of a variable "lang" according to the country code of the current computer. Action 509 is a conditional action. A conditional action such as action 509 conditionally executes a group of actions. In this example actions 510–513 are executed if the variable "lang" is not an empty string.

FIG. 6 illustrates an action properties screen 600 for action 509. As noted above, action property screens are used to define and configure actions. Action properties screen 600 includes field 601 containing the action name, field 602 containing the variable name and field 603 containing the variable comparison definition. The action name in field 601 is the name of action 509 seen in window 502 of screen 500. The variable name in field 602 indicates the variable who's value determines whether the group of actions is executed.

In the example of FIG. 6 the variable name is "countrycode" and its value was obtained from the registry file of the current computer by operation of action 508. Compare window 603 contains fields which define the conditions under which the action group 510–513 is executed. Field 604 is selectable between "does" and "does not". In the example of FIG. 6 field 604 is set to a value of "does not". Field 605 is selectable between "equal" and "contain" and is set to "contain" in this example. Field 606 contains the argument for the conditional action. In this example, the action group comprised of actions 510–513 are executed if the variable "countrycode" does not contain a blank string. In other words, if any country code for the current computer exists, then the action group comprised of actions 510–513 is executed. The contents and values of fields 601–606 of action properties window 600 are defined by a user prior to operation of the computer management system of the present invention.

Actions 510–511 operate to set the variable "lang" equal to "US" if the country code indicates a language of "United States". Action 510 is another conditional action and is defined using an action properties screen (not shown) similar to FIG. 6. If the variable "countrycode" equals "united-states" then action 511 is executed. Action 511 is a "set variable" action. FIG. 7 is an example of an action properties screen for defining the set variable action 511. Action properties screen 700 includes action name field 701, variable name field 702 and variable value field 703. Action name field 701 includes the name of action 511. Variable name field 701 contains the name of the variable, "lang", whose value is set by operation of this action. Field 703 contains the value to which the variable "lang" is set.

Conditional actions 512–513 are parallel in operation to conditional action 510 but for French and German language computers, respectively. If the action script hierarchy in window 502 were expanded, "set variable" actions associated with actions 512–513 would be visible. The net effect of actions 510–513, and the actions associated with actions 512–513 and not shown in FIG. 5, is to set the variable "lang" to the proper value depending on the variable countrycode value obtained from the current computer's registry file by operation of action 508.

The next actions 514–519 operate in similar fashion to actions 508–513 but with respect to processor type rather than country code. Action 514 is a get registry data action which retrieves the processor type of the current computer from the registry file of the current computer. Conditional action 515 is used to ensure, as with action 509, that some value for processor type has been retrieved from the registry file of the current computer. Actions 516–519 operate to set a variable "proc" to the proper value depending on whether the processor type of the current computer is Intel, ALPHA or PowerPC. There are "set variable" sub-actions (not shown) associated with actions 518–519.

Actions 508–519, as just described, operate to set the "lang" and "proc" variables so that the proper version of the program under test can be loaded and executed at the current computer. The remaining actions 520–523 are an outline of the actions necessary to construct the correct setup path and execute the setup on the current computer. In general terms, the proper version of the program under test and the proper set up files are selected based on the values of "lang" and "proc" for the current computer. Action 523 represents multiple actions (not shown) which together operate to load the proper version of the program under test and the setup files onto the current computer.

Figure 8:
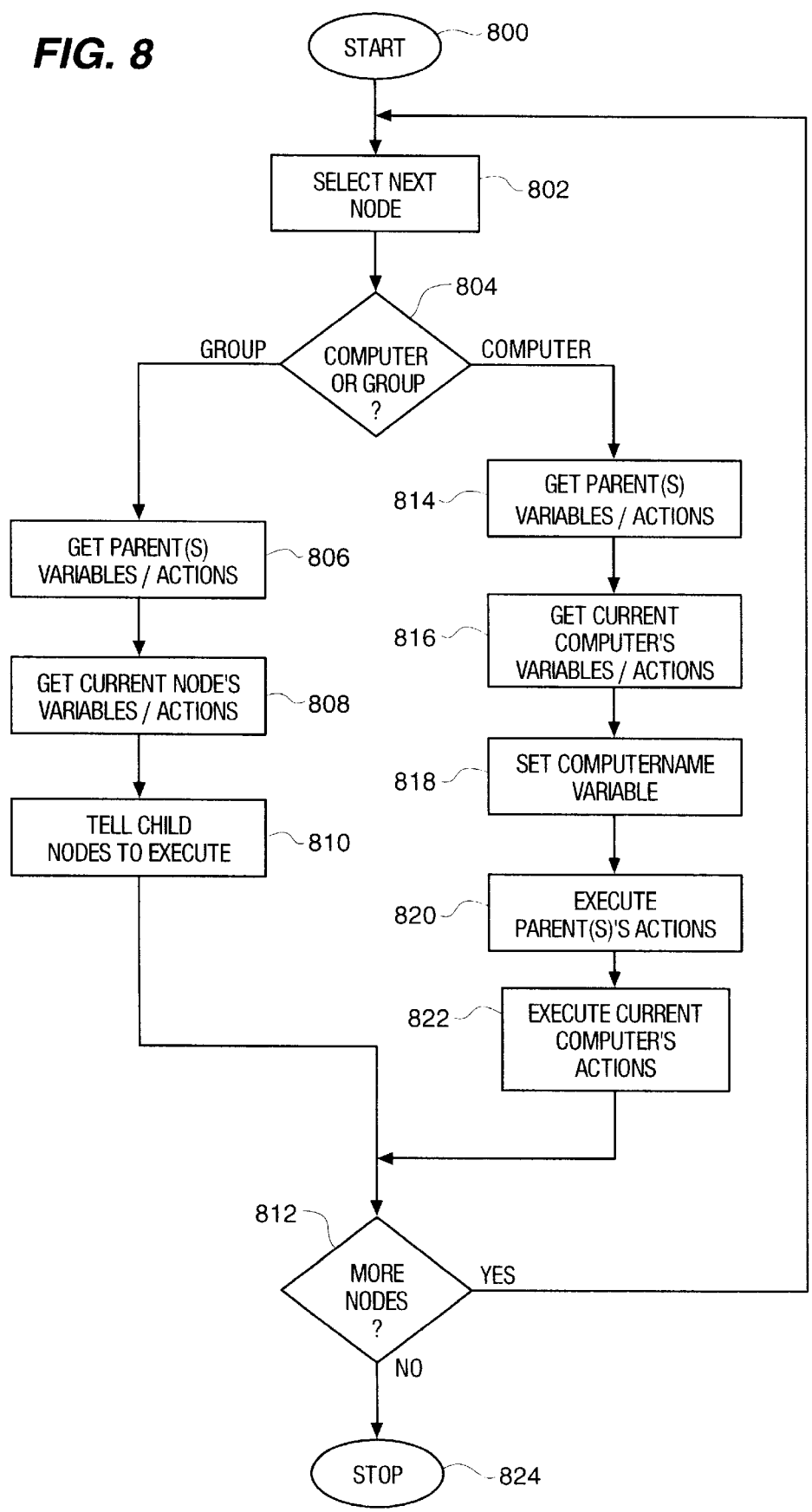
FIG. 8 is a flowchart illustrating the steps of execution of the system of the present invention.

FIGS. 2–7 illustrate the hierarchy, inheritance and variable usage of the system of the present invention from the point of view of a user of the system. FIGS. 2–7 represent the user interface a user manipulates to define an action script for the computer management system of the present invention. Once an action script is defined and configured, a user executes the action script against one, some or all of the nodes of the hierarchy. FIG. 8 is a flowchart for illustrating the execution of the system of the present invention once the setup described with respect to FIGS. 2–7 is complete.

Execution of the System of the Present Invention—FIG. 8

The processing of steps 800–824 begins with element 800 during which a user instructs the system of the present invention to execute. As noted above, a user executes an action script after the action script is configured. Processing then proceeds to step 802. During step 802 the next node in the hierarchy is selected. The first node selected is the highest node in the hierarchy, i.e., the node that is a parent to all other nodes in the system hierarchy of nodes. As steps 802–824 are successively executed, the system selects each next node down through the hierarchy until all nodes have been processed. A script execution session is established with respect to each node, as described below, during which the appropriate actions and variables are gathered for application against the currently selected node.

Decision block 804 operates to determine if the selected node is a group node or a computer node. If the selected node is a computer node then processing continues to step 814 else processing continues to step 806. With reference to FIG. 1, the system of the present invention is stored as file 108 on file storage 107. The variables and actions associated with each node in a hierarchy are also stored in file storage 107. During step 806 any variables or actions associated with any parent(s) to the selected group node are loaded to RAM 104 from file storage 107. For the first node (the "all computers" node) processed in a hierarchy, there are by definition no parent nodes. Processing then continues to step 808.

During step 808 the actions and variables associated with the currently selected node are retrieved and appended to the actions and variables retrieved during step 806. Processing next proceeds to step 810.

Step 810 operates to pass execution to the children node(s) of the currently selected group node. Processing continues to decision block 812 which determines if there are further nodes in the hierarchy to be processed. If there are further nodes to be processed then processing returns to step 802 else processing concludes with step 824.

If, by operation of decision block 804, it is determined that the currently selected node is a computer node then processing passes to step 814. Step 814 operates to retrieve the actions and variables associated with any parent(s) of the current computer. The set of actions and variables retrieved by operation of step 814 might include actions and variables associated with multiple layers of the system hierarchy if the currently selected node is multiple layers down in the hierarchy. Processing continues from step 814 to step 816.

Step 816 operates to retrieve the current computer's actions and variables. At this point, again referring to FIG. 1, RAM 104 contains the complete set of actions and variables related to the current computer. This includes all the actions and variables associated with the parent(s) to the current computer as well as the actions and variables directly associated with the current computer. This script execution session containing the complete set of actions and variables related to the current computer can have a different composition of actions and variables for each successively selected node. Processing then proceeds to step 818.

During processing step 818, the variable "computername" is set to the name of the current computer. Also during step 818, all other variables are set to the proper values for the current computer. Processing then continues to step 820.

During step 820 the actions related to the current computer's parent nodes are executed. Depending on the actions comprising a particular action script it may be important that the actions associated with the parent nodes are executed before the actions associated with the current computer. For example, a parent node has an action assigned to it by which an executable program "FOO.EXE" is copied from the server to the current node and a child node has an action assigned to it by which "FOO.EXE" is executed. The copy command ("Copy FOO.EXE") must occur before the execute command ("EXECUTE FOO.EXE"). Processing continues from step 820 to step 822 during which the actions of the current computer are executed.

A user might request a "Wait for Completion" flag when the action script for a certain application is configured. The "Wait for Completion" can be enabled node by node. The effect of an enabled "Wait for Completion" flag is that processing pauses at step 822 until a signal is received from the current computer indicating that any applications run in response to a "run remote application" action are completed. When such a confirmation or handshake is received then processing continues to decision block 812 which returns processing to step 802 if there are further nodes in the hierarchy to process. If the "Wait for Completion" flag is not enabled then processing goes directly from step 822 to decision block 812 without pausing until any remote applications have completed.

With reference to FIGS. 5 and 8, each successive time steps 802–824 are executed another one of nodes 504–507C is selected. With the selection of each node, the actions 508–523 are executed and, in the example of FIG. 5, the selected node is setup with a new configuration for testing.

Network Communications—FIG. 1

Data communications between server 100, referring to FIG. 1, and remote computers 109A–109N occur using whatever communications tools allow the exchange of data between two computers over a network. In a Microsoft Windows 95 or Microsoft Windows NT environment, the system of the present invention utilizes WinSock TCP controls to effect the exchange of data between server 100 and one of remote computers 109A–109N. A WinSock TCP server application is executed at each remote computer. A "run remote application" action in the system of the present invention contains a WinSock TCP client application. Thus when the system of the present invention is executed, and in particular when a "run remote application" action is executed, a WinSock TCP client connects to the currently selected computer and sends a data structure over the WinSock connection. The data structure is decomposed at the remote computer to a command string and option flags and the application is launched at the remote computer. WinSock connections are a standard component of the Windows operating system and the details of their use are known to those skilled in the art.

SUMMARY

The system of the present invention allows one to manage files on multiple networked computers, each of which have different characteristics—all from a single server and all with a single 'action script'. The user builds and configures the action script by defining generic actions which are applied to individual computers after replacing variables in the generic actions with values associated with a given computer. The action script is successively executed on each selected computer. Therefore a user, working from a single server, builds and executes a script which manages files or runs applications at any number of remote computers while automatically adjusting for differences in platform and setup of the various remote computers.

What is claimed is:

1. A method of managing, from a server computer, tasks to be performed on remote computers in a distributed network, the method comprising the steps of:

representing, to a user of the server computer, the remote computers in the distributed network as a hierarchical arrangement of nodes, including at least one group node representing a group of remote computers with like characteristics, and computer nodes representing respective remote computers in the distributed network;

defining at least one action to be performed on at least one of the remote computers;

assigning the at least one action to the at least one remote computer by associating the at least one action with at least a selected one of the nodes; and executing the at least one action on the at least one remote computer represented by the at least one selected node.

2. The method of claim 1, wherein the step of defining at least one action further comprises the step of displaying an action properties window that depicts properties of the action.

3. The method of claim 2, wherein the action properties window includes a node field for permitting a user to specify the node upon which the action is to be performed.

4. The method of claim 3, wherein the step of defining at least one action comprises the further step of specifying a variable name in the node field, the variable name designating a variable value that permits the action to be performed on two or more computers without changing the action properties.

5. The method of claim 4, wherein the step of defining at least one action further comprises the step of displaying a variable window for permitting a user to assign a variable value to the variable name for the selected node.

6. The method of claim 1, wherein the step of assigning the at least one action further comprises associating the at least one action with at least one of the group nodes and thereby associating the action with the computer nodes descending from the at least one group node.

7. The method of claim 1, wherein the step of executing the at least one action comprises the further steps of first determining whether the node is a child node and if so, first applying to the child node the actions and variables associated with a parent node and then applying to the child node the actions and variables associated with the child node.

8. The method of claim 1 wherein the step of executing the at least one action includes:

initiating a communications link between the server computer and the remote computer represented by the selected at least one node;

applying at least one action associated with a parent node of the selected at least one node over the communications link to the remote computer represented by the selected at least one node; and applying the at least one action associated with the selected node over said communications link to the remote computer represented by the selected at least one node.

9. The method of claim 1, wherein the step of representing further comprises the step of displaying to a user of the server computer a hierarchy window representing the hierarchical arrangement of nodes.

10. The method of claim 1, wherein the step of assigning the at least one action further comprises the steps of displaying to the user of the server computer an action properties window representing properties of an action to be performed on the at least one remote computer.

11. The method of claim 10, further comprising the step of displaying a node field in the action properties window for receiving user-input information specifying at least one node to which the action is to be assigned.

12. The method of claim 11, wherein the step of assigning the at least one action occurs in response to the user input of information specifying in the node field the at least one node to which the action is to be assigned.

13. The method of claim 11, where in the step of assigning the at least one action occurs in response to the user input of a variable name in the node field, the variable name designating a variable value that varies depending on the node and thereby permitting the action to be performed on two or more of the remote computers without changing the action properties.

14. A computer-readable medium having computer-executable instructions for managing from a server computer tasks to be performed on remote computers in a distributed network, the method comprising the steps of:

representing, to a user of the server, the remote computers in the distributed network as a hierarchical arrangement of nodes, including at least one group node representing a group of remote computers with like characteristics, and computer nodes representing respective remote computers in the distributed network;

defining at least one action to be performed on at least one of the computers;

assigning the at least one action to the at least one computer by associating the at least one action with at least a selected one of the nodes; and executing the action on the at least one computer represented by the at least one selected node.

15. The computer-readable medium of claim 14, wherein the step of representing the remote computers further comprises the step of displaying the computers in hierarchical relationship in a hierarchy window on a computer display, the hierarchy window representing the computer nodes as child nodes of the group nodes.

16. The computer-readable medium of claim 14, wherein the step of defining at least one action further comprises the step of displaying an action properties window that depicts properties of the action.

17. The method of claim 16, wherein the action properties window includes a node field for permitting a user to specify the node upon which the action is to be performed.

18. The computer-readable medium of claim 17, wherein the step of defining at least one action comprises the further step of specifying a variable name in the node field, the variable name designating a variable value that permits the action to be performed on two or more computers without changing the action properties.

19. The computer-readable medium of claim 18, wherein the step of defining at least one action further comprises the step of displaying a variable window for permitting a user to assign a variable value to the variable name for the selected node.

20. The computer-readable medium of claim 14, wherein the step of defining at least one action comprises the step of specifying a condition required for the action to be performed.

21. The computer-readable medium of claim 14, wherein the step of assigning the at least one action further comprises associating the at least one action with at least one of the group nodes and thereby associating the action with the computer nodes descending from the at least one group node.

22. The computer-readable medium of claim 14, wherein the step of executing the at least one action comprises the further steps of first determining whether the node is a child node and if so, first applying to the child node the actions and variables associated with a parent node and then applying to the child node the actions and variables associated with the child node.

23. The computer-readable medium of claim 14, wherein the step of defining at least one action includes the step of defining a computer command to be executed on the at least one computer.

24. The computer-readable medium of claim 14, wherein said step of executing said actions includes:

initiating a communications link between the server computer and the remote computer represented by the selected at least one node;

applying at least one action associated with a parent node of the selected at least one node over the communications link to the remote computer represented by the selected at least one node; and applying the at least one action associated with the selected node over said communications link to the remote computer represented by the selected at least one node.

25. The computer-readable medium of claim 14, wherein the step of representing further comprises the step of displaying to a user of the server computer a hierarchy window representing the hierarchical arrangement of nodes.

26. The computer-readable medium of claim 14, wherein the step of assigning the at least one action further comprises the steps of displaying to the user of the server computer an action properties window representing properties of an action to be performed on the at least one remote computer.

27. The computer-readable medium of claim 26, further comprising the step of displaying a node field in the action properties window for receiving user-input information specifying at least one node to which the action is to be assigned.

28. The computer-readable medium of claim 27, wherein the step of assigning the at least one action occurs in response to the user input of information specifying in the node field the at least one node to which the action is to be assigned.

29. The computer-readable medium of claim 27, wherein the step of assigning the at least one action occurs in response to the user input of a variable name in the node field, the variable name designating a variable value that varies depending on the node and thereby permitting the action to be performed on two or more of the remote computers without changing the action properties.

30. In a computer system having a graphical user interface including a display and a selection device, a method of managing files on a distributed network comprising multiple networked computers each having different characteristics, the method comprising the steps of:

displaying a hierarchy window representing the distributed network as a hierarchy of nodes, including group nodes, which represent respective groups of computers in the distributed network with like characteristics, and computer nodes, which represent respective computers in the distributed network;

displaying an action window for permitting a user to assign to a selected one of the nodes one or more selected actions to be performed on computers represented by the selected node, the action window including a field containing the name of the node to which the action applies, the field containing a variable name for assuming a variable value associated with the selected node;

displaying a variable window for permitting a user to assign a variable value to the variable name for the selected node;

selecting a node in the hierarchy window;

defining variables for the node;

assigning actions to the node, the actions including variable names assigning values to the variables defined for the selected node; and executing the actions assigned to the node using the variables assigned to the node by first applying the actions and variables assigned to a parent node to the selected node and then applying to the selected node the actions and variables assigned thereto.

31. A method of managing computer tasks to be performed on remote computers in a distributed network, including a server computer, a display and a user interface selection device, the method comprising the steps of:

displaying to a user of the server computer a hierarchy window representing the remote computers in the distributed network as a hierarchical arrangement of nodes, including at least one group node representing a group of remote computers with like characteristics, and computer nodes representing respective remote computers in the distributed network;

displaying to the user of the server computer an action properties window representing properties of an action to be performed on at least one of the remote computers, the action properties window having a node field for receiving information specifying at least one node to which the action is to be assigned;

in response to the user input of information specifying the at least one node to which the action is to be assigned, assigning the action to at least one of the remote computers represented by the at least one node; and executing the action on the at least one of the remote computers.

32. The method of claim 31, further comprising the step of:

receiving a user input variable name in the node field, the variable name designating a variable value that varies depending on the node and thereby permits the action to be performed on two or more of the remote computers without changing the action properties.

33. The method of claim 31, further comprising the step of displaying a variables window representing the value assigned to the variable name for the selected node.

34. The method of claim 31, wherein the step of assigning the action to at least one of the remote computers represented by the at least one node further comprises assigning the action to at least one of the group nodes and thereby associating the action with the computer nodes represented by at least one group node.

35. The method of claim 31, wherein the step of executing the action comprises the further steps of first determining whether the node representing the at least one remote computer is a child node and if so, first applying to the child node the actions and variables associated with a parent node and then applying to the child node the actions and variables associated with the child node.

* * * * *

UNITED STATES PATENT AND TRADEMARK OFFICE
CERTIFICATE OF CORRECTION

PATENT NO.: 6,098,067
DATED: August 1, 2000
INVENTOR: Alan K. ERICKSON

It is certified that an error appears in the above-identified patent and that said Letters Patent is hereby corrected as shown below:

On the title page, under [73] Assignee information:

"Kabushiki Kaisha Toshiba, Kawasaki, Japan" has been replaced with
-- Microsoft, Redmond, Washington --.

Signed and Sealed this

Twenty-second Day of May, 2001

*Attest:*

NICHOLAS P. GODICI

*Attesting Officer*  Acting Director of the United States Patent and Trademark Office